(12) United States Patent
Tatara et al.

(10) Patent No.: US 8,419,873 B2
(45) Date of Patent: Apr. 16, 2013

(54) TIRE BUILDING METHOD AND RUBBER STRIP BONDING APPARATUS

(75) Inventors: Tetsuo Tatara, Osaka (JP); Yu Hatayama, Osaka (JP); Masami Tanabe, Osaka (JP); Taizo Yamamoto, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 655 days.

(21) Appl. No.: 12/376,089

(22) PCT Filed: Aug. 8, 2006

(86) PCT No.: PCT/JP2006/315682
§ 371 (c)(1),
(2), (4) Date: Apr. 3, 2009

(87) PCT Pub. No.: WO2008/018120
PCT Pub. Date: Feb. 14, 2008

(65) Prior Publication Data
US 2009/0188607 A1 Jul. 30, 2009

(51) Int. Cl.
*B29D 30/28* (2006.01)
*B29D 30/30* (2006.01)

(52) U.S. Cl.
USPC ........... 156/117; 156/123; 156/397; 156/408; 156/413; 156/421

(58) Field of Classification Search .................. 156/117, 156/130, 130.3, 397, 405.1, 408, 410, 412, 156/413, 421
See application file for complete search history.

(56) References Cited

U.S. PATENT DOCUMENTS

| | | | | |
|---|---|---|---|---|
| 4,276,105 A | * | 6/1981 | Gessaga | 156/130.3 |
| 4,306,931 A | * | 12/1981 | Klose | 156/413 |
| 4,371,410 A | * | 2/1983 | Stevens | 156/117 |
| 2004/0013754 A1 | | 1/2004 | Hirai et al. | |

FOREIGN PATENT DOCUMENTS

| | | |
|---|---|---|
| JP | 63-7938 A | 1/1988 |
| JP | 2002-178415 A | 6/2002 |
| JP | 2004-216603 A | 8/2004 |

(Continued)

OTHER PUBLICATIONS

International Search Report of PCT/JP2006/315682, date of mailing Nov. 7, 2006.

*Primary Examiner* — Katarzyna Wyrozebski Lee
*Assistant Examiner* — Scott W Dodds
(74) *Attorney, Agent, or Firm* — Westerman, Hattori, Daniels & Adrian, LLP

(57) ABSTRACT

The invention can surely accomplish lamination without the generation of voids in building a tire constructed to comprise a plurality of rubber members for a tire when a ribbon-shaped rubber strip (R) is spirally wound and laminated, and uses holding rolls (30) and two sets of stitching rolls (40a), (40b) arranged in parallel with a center of a rubber strip width (W) therebetween to enable performing of an independent pressing motion, such that the rubber strip (R) is pressed and bonded by the holding rolls (30) in a position, in which the rubber strip (R) is wound, and the stitching roll (40a) or (40b) positioned fore in an advancing direction of traverse movement, out of the two sets, is caused to perform a pressing motion in a regional part just after the press whereby a fore part of the rubber strip in the advancing direction is pressed and bonded.

2 Claims, 6 Drawing Sheets

FOREIGN PATENT DOCUMENTS

| | | |
|---|---|---|
| JP | 2004-216726 A | 8/2004 |
| JP | 2004-358738 A | 12/2004 |
| JP | 2007-223223 * | 9/2007 |
| WO | 02/078939 A1 | 10/2002 |

* cited by examiner

TIRE BUILDING METHOD AND RUBBER STRIP BONDING APPARATUS

TECHNICAL FIELD

The present invention relates to a tire building method, in which at least one rubber member of a tire constructed to comprise a plurality of rubber members for a tire is built by winding a ribbon-shaped rubber strip, and an apparatus for bonding a rubber strip.

BACKGROUND ART

Generally, a tire is formed from a plurality of tire constructing members. As shown in, for example, FIG. 8, respective parts such as an inner liner 2, a tread 3, side walls 4, and rim strips 5 are formed from rubber members, which are conformed to characteristics as demanded, and the rubber members are combined with tire reinforcement members, which contain cords such as a carcass layer 6 and a belt layer 7 to constitute a tire T. The reference numeral 8 in the figure denotes a bead portion including bead cores 9.

Conventionally, in order to build the respective rubber members, intended rubber members are obtained by performing extrusion through dies conformed to cross sectional shapes of the respective rubber members and then performing cut to predetermined length. A tire is built by sequentially sticking the rubber members on a building drum. For example, an inner liner, a lengthy sheet having a predetermined width is cut to predetermined length to be wound around a cylindrical-shaped building drum and the both ends of the sheet thus cut are joined in one location in a circumferential direction.

In recent years, in terms of conformability of a tire to multi-product small lot production, assembly accuracy, improvement in productivity, etc., as shown in, for example, JP-A-2002-178415, JP-A-2004-358738, JP-A-2004-216603, and JP-A-2004-216726, respective rubber members such as an inner liner are formed into predetermined cross sectional shapes by winding an unvulcanized rubber strip, which is extrusion-formed in a ribbon configuration, round cylindrical-shaped rotary support body, such as a building drum, spirally in a tire circumferential direction while overlapping a part of the rubber strip.

When the rubber strips are spirally wound and built, in order to push the rubber strips, which are continuously supplied, against a peripheral surface of the rotary support body to bond the rubber strips and air to escape between the rubber strips, a holding roll is ordinarily used simultaneously with winding of the rubber strips to sequentially press the rubber strips to stick the same (for example, JP-A-2004-216603 and JP-A-2004-216726).

At this time, as shown in FIG. 6, rubber strips R as wound with partial overlapping are susceptible to variation in a laminated posture 1R at a first circumference of winding and in a laminated posture 2R at a second circumference of winding. Laminated postures at subsequent circumferences (on and after a third circumference) are the same as that described above such that postures are varied according to feed pitches of rubber strips R and cross sectional shapes of rubber strips R, and fore portions in an advancing direction of traverse movement become concave. For rubber strips R, which are varied in posture, a simply cylindrical-shaped holding roll 130 in parallel to a peripheral surface of a rotary support body 110 shown in FIG. 7 is difficult to exert a pressing force on the whole width of the rubber strips R and so there is a fear that a pressing force on fore, concave portions in the advancing direction (arrow B) is short to lead to insufficient pressing and remaining voids. Also, depending upon patterns of winding, in the case in which a wind beginning position in winding of plural layers such as two layers is at positions other than edges of a rubber member of a building object, variation in a strip posture in the vicinity of wind beginning is further increased in addition to variation caused by steps due to the thickness of the rubber strips in the states described above, so that shortage in pressing force is brought about.

In, for example, JP-A-2004-216603, in addition to an applicator roll including a holding roll and serving to supply rubber strips to a rotary support body to spirally wind the same for sticking, a stitching roll is provided in a region just after sticking by the applicator roll to press and bond edge portions, which form steps due to overlapping of the rubber strips, against the rotary support body and squeeze steps formed in the edge portions, and the stitching roll squeezes the edge portions to eliminate the steps.

With the proposal described above, the stitching roll is fundamentally provided to position so that a width center thereof can become substantially the same as that of the applicator roll with a view to squeezing those steps at the edge portions caused by spiral winding with the rubber strips partially overlapping, that is, steps at rearward edge portions in the advancing direction of traverse movement, so that fore, concave portions in the advancing direction of traverse movement are not locally pressed for variation in laminated posture caused by spiral winding with partial overlapping. Therefore, there is a fear that fore portions in the advancing direction of traverse movement are not pressed sufficiently and voids are produced. That is, pressing intended for squeezing voids generated between rubber strips in view of variation in laminated postures in the advancing direction of traverse movement of the rubber strips is difficult.

Patent Document 1: JP-A-2002-178415
Patent Document 2: JP-A-2004-358738
Patent Document 3: JP-A-2004-216603
Patent Document 4: JP-A-2004-216726

DISCLOSURE OF THE INVENTION

Problems to be Solved by the Invention

The invention has been thought of in order to solve the problem and has its object to provide a tire building method capable of accomplishing a sure and favorable bond without the generation of voids in building a tire constructed to comprise a plurality of rubber members for a tire when a ribbon-shaped rubber strip continuously supplied from a supply device capable of traverse motion relative to a rotary support body is wound, and an apparatus for bonding a rubber strip used in tire building.

Means for Solving the Problems

The invention has a feature in a tire building method of spirally winding and laminating a ribbon-shaped rubber strip supplied from a supply device, which makes a traverse movement relative to a rotary support body for building, on an outer peripheral surface of the rotary support body for at least one rubber member of a tire constructed to comprise a plurality of rubber members for a tire, the method comprising using a holding roll arranged to enable pressing a total width of the rubber strip and two sets of stitching rolls arranged in parallel fore and aft in a direction of traverse movement with a center of a rubber strip width therebetween to enable performing of an independent pressing motion, causing the holding roll to press and bond the rubber strip in a position, in which the rubber strip is wound round a peripheral surface of the rotary support body, and causing the stitching roll positioned fore in an advancing direction of the traverse movement, out of the two sets of stitching rolls, to perform a pressing motion in a regional part just after the press whereby a fore part of the rubber strip in the advancing direction is pressed and bonded.

With the tire building method, even in case of either of left and right spiral windings, the stitching roll positioned fore in the advancing direction of traverse movement, out of the two sets, is caused to perform a pressing motion whereby a portion, on which press only by the holding roll is made insufficient due to variation in a laminated posture of the rubber strip, in particular, that portion positioned fore in the advancing direction of traverse movement, which is made concave due to spiral winding accomplished by traverse movement, can be pressed by the stitching roll, so that pressing can be accomplished without the generation of shortage in pressing force over a total width of the rubber strip and bonding and laminating can be accomplished without the generation of voids between the rubber strips.

In the tire building method described above, when the rubber strip is wound in plural layers owing to reciprocation of traverse movement, the stitching roll positioned fore in an advancing direction of respective reciprocatory traverse movements is used to preferably press respective fore parts of the rubber strip width in the advancing direction. Thereby, in either of the reciprocatory traverse movements, the stitching roll positioned fore in an advancing direction of traverse movement can surely press a fore part of the rubber strip width.

Further, the invention has a feature in a rubber strip bonding apparatus used in carrying out the tire building method, the bonding apparatus being mounted on a rubber strip supply device, which is arranged in opposition to the rotary support body for building, provided to enable a traverse movement relative to the rotary support body, and provided to supply a ribbon-shaped rubber strip toward the rotary support body, and the bonding apparatus comprising a holding roll arranged to enable pressing of a total width of the rubber strip in a position, in which the rubber strip supplied from the supply device is wound round a peripheral surface of the rotary support body, and two sets of stitching rolls arranged in parallel fore and aft in a direction of traverse movement with a center of the rubber strip width therebetween to enable performing of an independent pressing motion in a regional part just after a position, in which press is made by the holding roll, and wherein the stitching rolls are provided so that the stitching roll positioned fore in an advancing direction of the traverse movement performs a pressing motion.

With the bonding apparatus, when spiral winding and laminate building of a rubber strip is accomplished in traverse movement, that portion positioned fore in the advancing direction, which is made concave due to spiral winding, can be surely pressed by the stitching roll, so that pressing can be accomplished without the generation of shortage in pressing force over a total width of the rubber strip and the building method can be surely carried out.

With the bonding apparatus, preferably, the holding roll and the two sets of stitching rolls, respectively, are arranged on a part of the rubber strip supply device to enable performing of an independent pressing motion and move together with a traverse movement of the supply device. Thereby, when a rubber strip is wound, there is no need of adjustment, complex control, and a positioning device to accommodate for variation in winding pitch, winding pattern, irregularities, etc., so that only a combination of a holding roll and stitching rolls enables bonding of a rubber strip and escape of an air.

Also, with the bonding apparatus, the supply device of a ribbon-shaped rubber strip can comprise an extruder for extruding of a rubber material in a ribbon-shaped configuration, and the holding roll and the stitching rolls can be provided in the vicinity of a head portion of the extruder. Thereby, while a ribbon-shaped rubber strip having a predetermined cross sectional shape is extruded and supplied from the extruder, the rubber strip being wound can be wound and built as it is bonded by the holding roll and the stitching rolls.

With the bonding apparatus, the two sets of stitching rolls can be arranged adjacent to each other in parallel with a center of a rubber strip width therebetween and provided so that the stitching roll positioned fore in an advancing direction of traverse movement presses a portion of the rubber strip width positioned fore in the advancing direction. Thereby, it is possible to surely press a part of the rubber strip width positioned fore in the advancing direction.

Preferably, outer peripheral surfaces of the two sets of stitching rolls are arcuate in cross section. Thereby, it is possible to surely press that portion positioned fore in the advancing direction, which is made concave due to spiral winding accomplished by traverse movement, thus enabling bonding so as to eliminate possible voids.

Effect of the Invention

As described above, with the tire building method and the rubber strip bonding apparatus according to the invention, in the case where a ribbon-shaped rubber strip is spirally wound and laminated for at least one rubber member of a tire, the stitching roll positioned fore in the advancing direction of traverse movement, out of the two sets, is caused to perform a pressing motion whereby a portion, on which press only by the holding roll is made insufficient due to variation in a laminated posture of the rubber strip, in particular, that portion positioned fore in the advancing direction of traverse movement, which is made concave, can be pressed by the stitching roll, so that bonding can be accomplished surely and with no voids without the generation of shortage in pressing force over a total width of the rubber strip.

In particular, by arranging two sets of stitching rolls in parallel fore and aft with a width direction center of the rubber strip supplied to the rotary support body therebetween, there is no need of adjustment, complex control, and a positioning device to accommodate for variation in winding pitch of the rubber strip, winding pattern of the rubber strip, irregularities, etc., so that only a combination of a holding roll and stitching rolls enables bonding of a rubber strip and escape of an air.

BEST MODE FOR CARRYING OUT THE INVENTION

A mode for carrying out the invention will be described below on the basis of an embodiment shown in the drawings.

FIG. 1 is a schematic, side view showing a state, in which a ribbon-shaped rubber strip is wound by a building apparatus, which carries out a tire building method according to the invention, FIG. 2 is a schematic, plan view showing the state, FIG. 3 is a schematic, plan view showing a state of press by a holding roll as viewed in a direction of an arrow A in FIG. 1, FIGS. 4 and 5, respectively, are schematic, plan views showing a state of press by a stitching roll as viewed in the direction of the arrow A in FIG. 1, FIG. 6 is a cross sectional view showing a posture of winding of rubber strips, and FIG. 7 is a view illustrating a pressed state by a conventional holding roll.

In the drawings, the reference numeral 10 denotes a rotary support body for building, which is rotatable about a central axis 11, the rotary support body comprising a cylindrical-shaped building drum, which is ordinarily constructed to enable expanding and contracting. The reference numeral 20 denotes an extruder arranged in opposition to the rotary support body 10 to serve as a device that supplies a ribbon-shaped rubber strip R, the extruder being provided so that the ribbon-shaped rubber strip R having a predetermined cross sectional shape conformed to a tire rubber member, such as inner liner, tread, side walls, and rim strip, being an object for building is extruded and supplied toward the rotary support body 10 from a die 22 provided at a tip end of a head portion 21.

The extruder 20 is provided to enable a traverse movement relative to the rotary support body 10 in an axial direction. Thereby, the ribbon-shaped rubber strip R extruded from the extruder 20 is continuously supplied to a peripheral surface of the rotary support body 10, partially overlapped, wound spirally, and laminated with the traverse movement and rotation of the rotary support body 10. Traverse movement caused when the rubber strip R is wound includes the case of moving the rotary support body 10 in an axial direction, as well as the case of moving the extruder 20 toward the rotary support body 10 in an axial direction thereof.

A device that supplies the rubber strip R is not limited to the extruder 20 but comprises a supply device that continuously feeds and supplies a rubber strip, which is extruded and fed in a separate process.

A bonding apparatus used in winding and building the rubber strip supplied in the manner described above has the following construction.

The reference numeral 30 denotes a set of holding rolls supported by a support bracket 23 connected and fixed to the head portion 21 of the extruder 20 as a device that supplies the rubber strip, and arranged to enable pressing of the rubber strip R extruded and supplied from the extruder 20. The holding rolls 30 are arranged so that cylindrical-shaped roll bodies 31 made of an elastic body, such as rubber and polyurethane, having an elasticity suited to press are journaled in parallel to a peripheral surface of the rotary support body 10, supported to be advanced to and retreated from the peripheral surface of the rotary support body 10 by an actuator 33, such as air cylinder, mounted (depiction of mount means is omitted) to the support bracket 23, and perform an advancing motion at the time of winding of the rubber strip R to thereby press the rubber strip R in a position, in which the rubber strip R is wound. In particular, the roll bodies 31 have a larger, axial width than a width of the rubber strip R extruded from the die 22 of the extruder 20 as viewed in plan view and are arranged in positions conformed to the rubber strip R so as to enable pressing of a total width of the rubber strip R. The reference numeral 35 in the figure denotes journal members of the roll bodies 31.

The reference numerals 40a, 40b denote two sets of stitching rolls arranged to press the rubber strip R in a regional part just after a position, in which press is made by the holding rolls 30, the respective stitching rolls being arranged in parallel fore and aft in the advancing direction of the traverse movement with a center C width direction of the rubber strip R extruded and supplied toward the peripheral surface of the rotary support body 10 from the die 22 of the extruder 20 therebetween. In particular, as shown in the figure, the two sets of stitching rolls 40a, 40b are supported so that respective roll bodies 41, 41 are arranged adjacent to each other in parallel with the width direction center C therebetween to be rotatably journaled by the journal members 45, 45 and caused by actuators 43, 43, such as air cylinder, mounted (depiction of mount means is omitted) to the support bracket 23, to perform a pressing motion independently, the roll bodies being provided to press a fore part of the rubber strip R wound round and laminated on the rotary support body 10, preferably, a range of ¼ to ½ times a rubber strip width W from an edge in the advancing direction of traverse movement owing to the pressing motion of the stitching roll 40a or 40b positioned fore in the advancing direction.

In terms of escape of an air by press and an effect of bond, outer peripheral surfaces of the respective roll bodies 41, 41 of the stitching roll 40a or 40b are preferably arcuate in cross section, and in particular, spherical in shape like a blastomere formed by cutting both sides of a spherical body. Also, the stitching rolls 40a, 40b preferably have a larger width than ½ the rubber strip width W, for example, a substantially the same width as the rubber strip width W as shown in the figure. Of course, a smaller width than the width can also be used depending upon the cross sectional shape of the rubber strip R.

The roll bodies 41, 41 of the stitching rolls 40a, 40b are preferably made of an elastic body, such as rubber and polyurethane, having a moderate elasticity like the holding rolls 30. Further, it is possible to use metallic rolls.

With the building apparatus provided with the bonding apparatus constructed in the manner described above, for at least one of rubber members constituting a tire, when a ribbon-shaped rubber strip R extruded from the extruder 20 as a supply device is spirally wound and laminated owing to rotation of the rotary support body 10 and relative traverse movement of the extruder 20 relative to the rotary support body 10, the rubber strip R is pressed and bonded by the holding rolls 30 in a position, in which the rubber strip R is wound round the peripheral surface of the rotary support body 10, that is, in a position, in which the rubber strip R extruded from the extruder 20 abuts against the rotary support body 10 to begin to be wound (FIG. 3). At this time, the holding rolls 30 press convex portions formed by overlap of the rubber strip R, a part of which overlaps and is wound.

In case of either of left and right spiral windings, the stitching roll 40a or 40b positioned fore in the advancing direction of traverse movement, for example, the stitching roll 40a out of the two sets of stitching rolls 40a, 40b is caused in the regional part just after press to perform a pressing motion whereby a fore part of the rubber strip R in the advancing direction (a direction of an arrow B in the figure) is pressed and bonded. In the case where the advancing direction of traverse movement is opposite to that described above, the stitching roll 40b positioned fore in the advancing direction is caused to perform a pressing motion whereby a fore part in the advancing direction is pressed and bonded in the manner described above.

Thereby, a portion, on which a pressing force only by the holding rolls 30 is made insufficient due to variation in a laminated posture of the rubber strip R, in particular, that portion positioned fore in the advancing direction, which is made concave due to spiral winding accomplished by traverse movement, can be surely pressed by the stitching roll 40a or 40b, so that a sufficient bond can be accomplished so as to eliminate possible voids generated between the rubber strip R and the rubber strip R.

Also, as shown in FIG. 5, in winding the rubber strip R in plural layers owing to reciprocation of traverse movement with a width direction center of the rotary support body 10 as a wind beginning position of the rubber strip R, the stitching roll 40a positioned fore in the advancing direction B is caused in the same manner as that in FIG. 4 to perform a pressing motion when the traverse movement goes from a center to an edge portion, and the stitching roll 40b positioned fore in the advancing direction opposed to that described above is caused in the same manner as that in FIG. 5 to perform a pressing motion when the traverse movement returns after it turns back at the edge portion. Thereby, in either of a first layer and a second layer made by spiral winding accomplished by traverse movement, it is possible to readily conform to variation in a laminated posture as well as to a step in a wind beginning position and to use the stitching roll 40a or 40b to surely press that portion positioned fore in the advancing direction, which is made concave due to spiral winding. Therefore, in case of winding of plural layers, bonding and winding lamination can be made so as to eliminate possible voids generated between the rubber strip R and the rubber strip R.

In addition, while the embodiment described above has been described with respect to the case where a ribbon-shaped rubber strip R being spirally wound and laminated is spirally wound round and laminated on the cylindrical-shaped building drum as the rotary support body 10, a rotary support body includes one formed by winding and laminating a carcass layer or a belt layer or other rubber layers as a base layer on the building drum and so the rubber strip can be wound round and laminated on the base layer in the same manner as that described above. Further, also in the case where, for example, a side wall or the like is wound round and laminated on a cylindrical-shaped band case or a green tire, which undergoes shaping deformation, the embodiment can be carried out with the band case or the green tire as a rotary support body in the same manner as that described above. Also, the embodiment can be carried out also in the case where a conventional extruded member and a rubber strip member are combined to laminated a predetermined rubber member. At this time, in pressing a conventional extruded member having a thickness, two sets of stitching rolls of the bonding apparatus can be caused to perform a pressing motion simultaneously.

Industrial Applicability

The invention can be preferably made use of in a tire building method, in which at least one rubber member of a tire constructed to comprise a plurality of rubber members for a tire is built by spirally winding and laminating a ribbon-shaped rubber strip supplied from a supply device, which makes traverse movement relative to a rotary support body for building, on an outer peripheral surface of the rotary support body.

DESCRIPTION OF REFERENCE NUMERALS AND SIGNS

Figure 1:
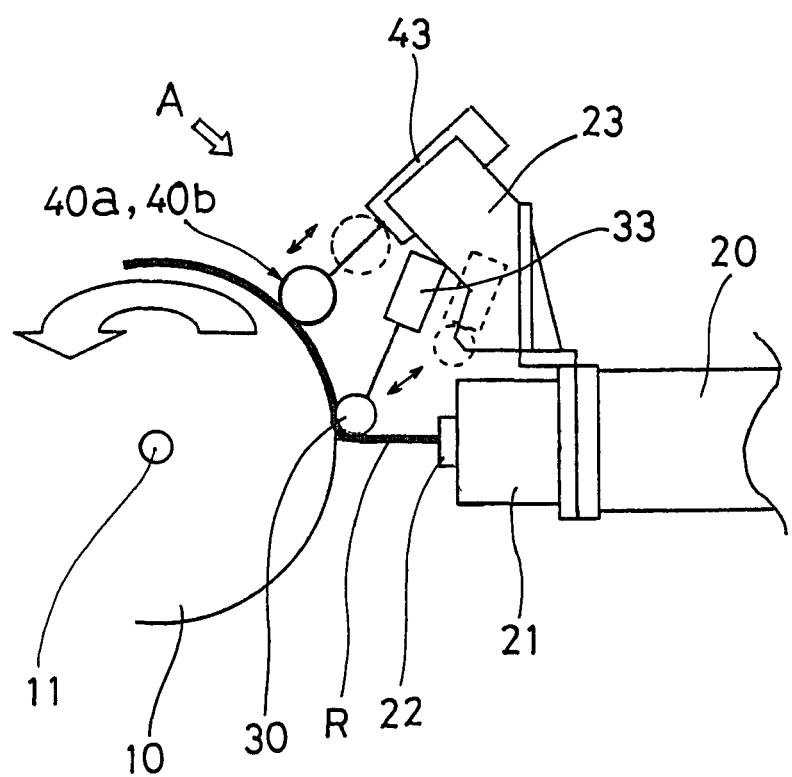
FIG. 1 is a schematic, side view showing a state, in which a ribbon-shaped rubber strip is wound by a building apparatus, which carries out a tire building method according to the invention.
Figure 2:
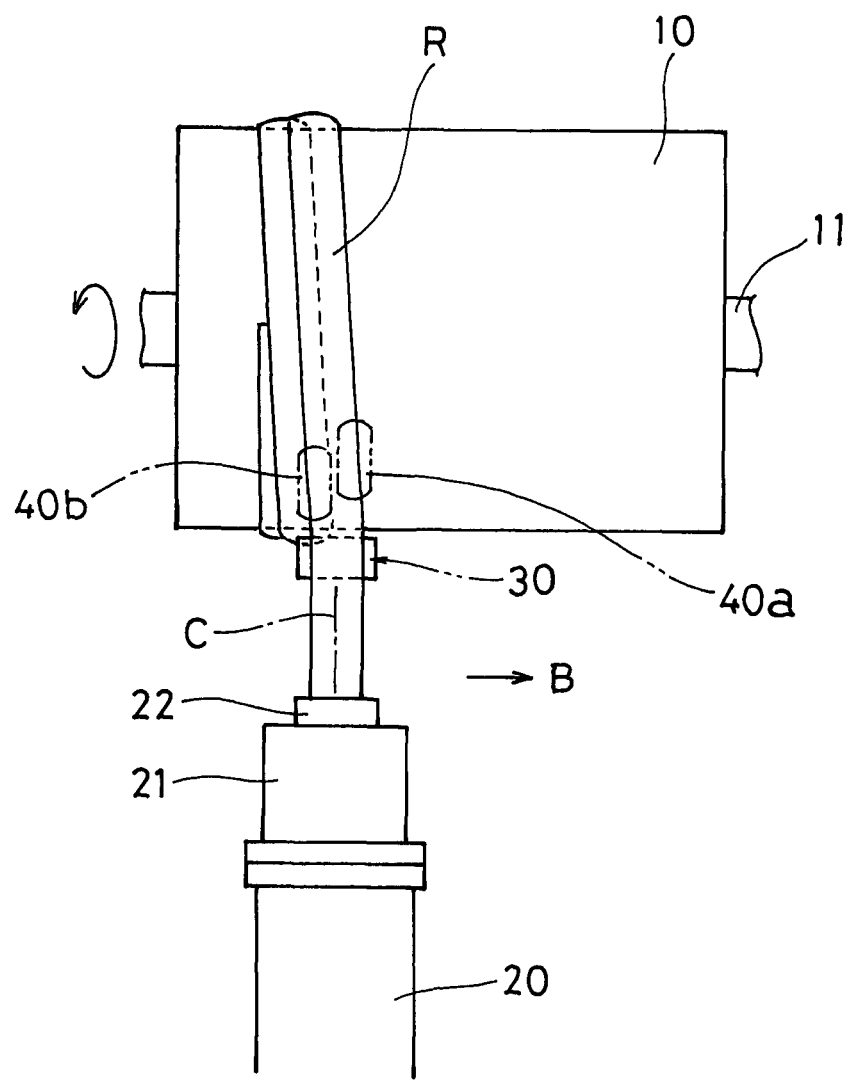
FIG. 2 is a schematic, plan view showing the state.
Figure 3:
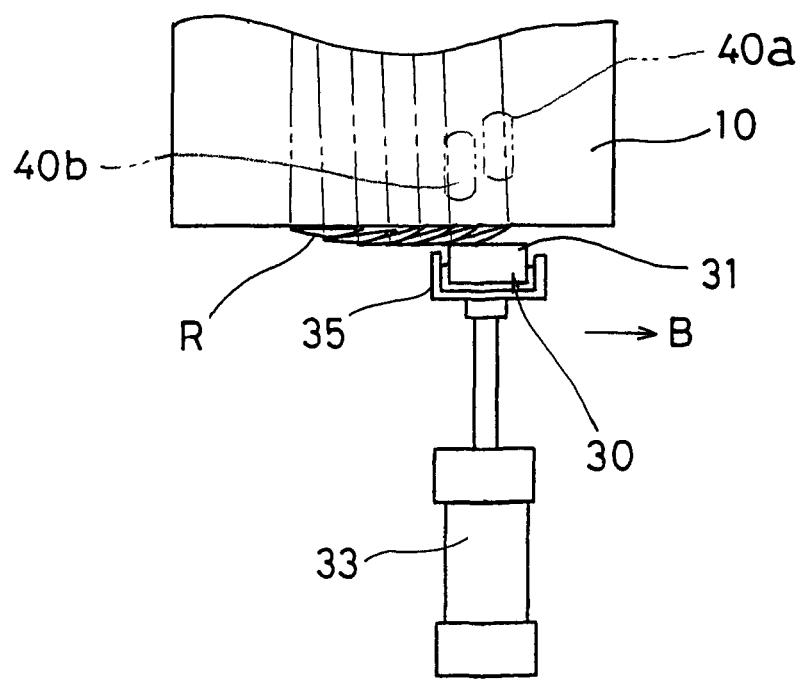
FIG. 3 is a schematic, plan view showing a state of press by a holding roll as viewed in a direction of an arrow A in FIG. 1.
Figure 4:
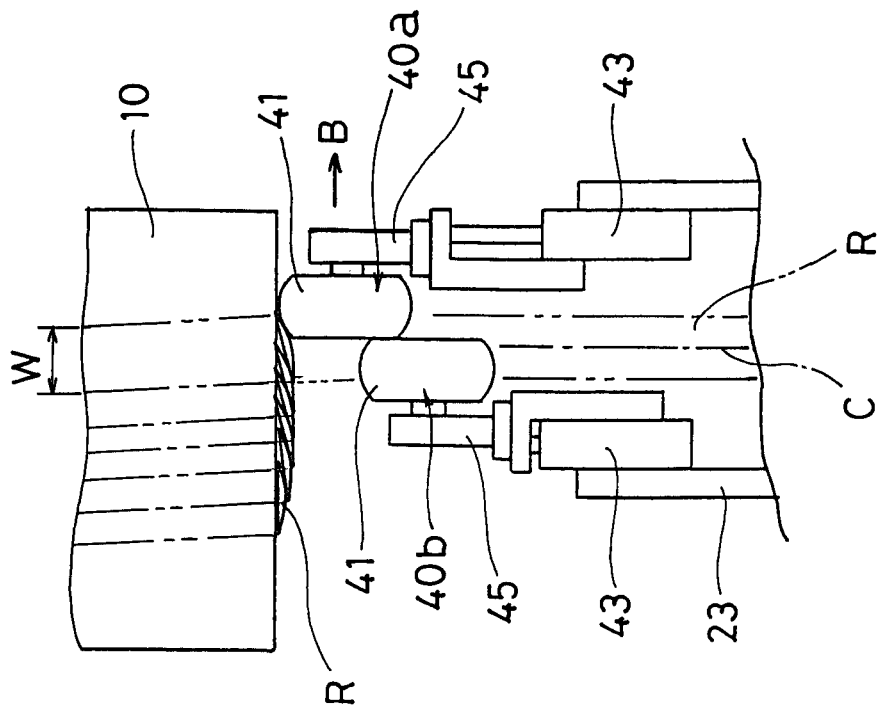
FIG. 4 is a schematic, plan view showing a state of press by a stitching roll as viewed in the direction of the arrow A in FIG. 1.
Figure 5:
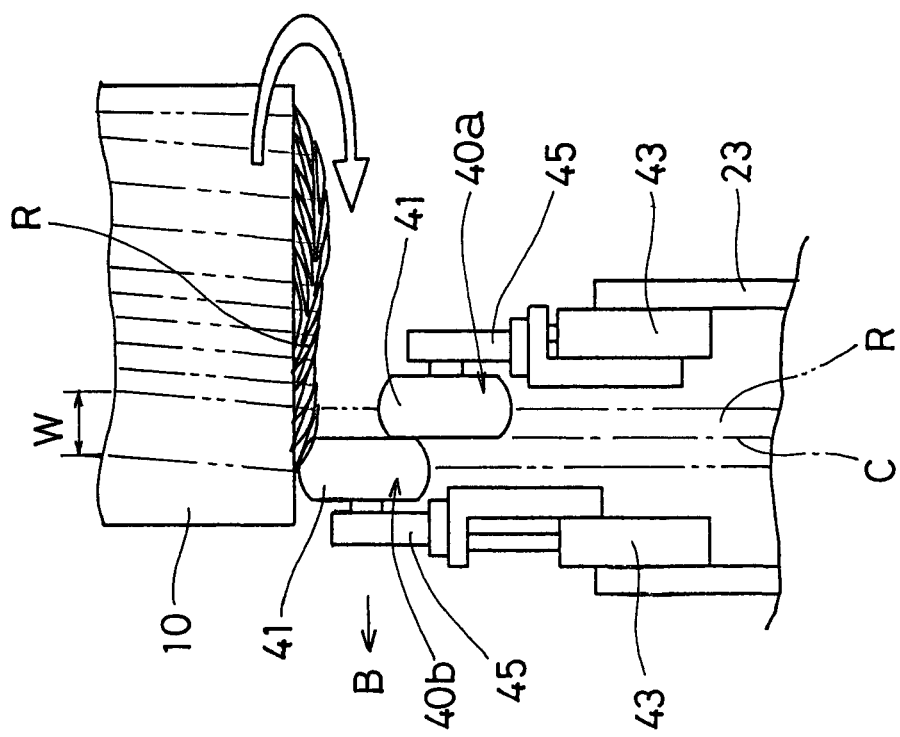
FIG. 5 is a schematic, plan view showing a state of press by a stitching roll as viewed in the direction of the arrow A in FIG. 1.
Figure 6:
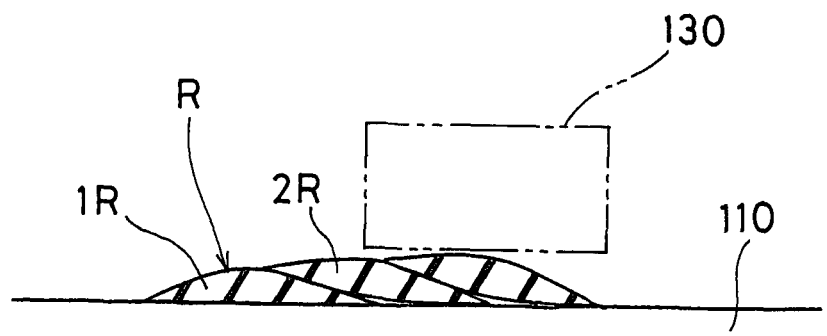
FIG. 6 is a cross sectional view showing a posture of winding of rubber strips.
Figure 7:
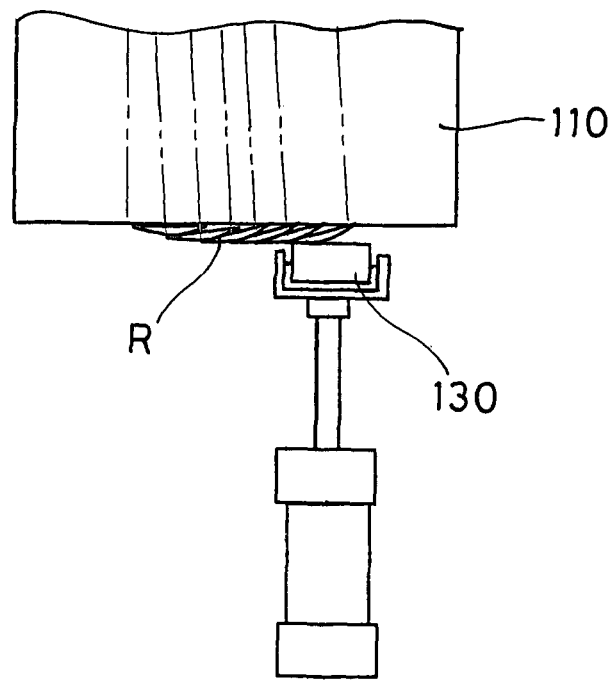
FIG. 7 is a view illustrating a pressed state by a conventional holding roll.
Figure 8:
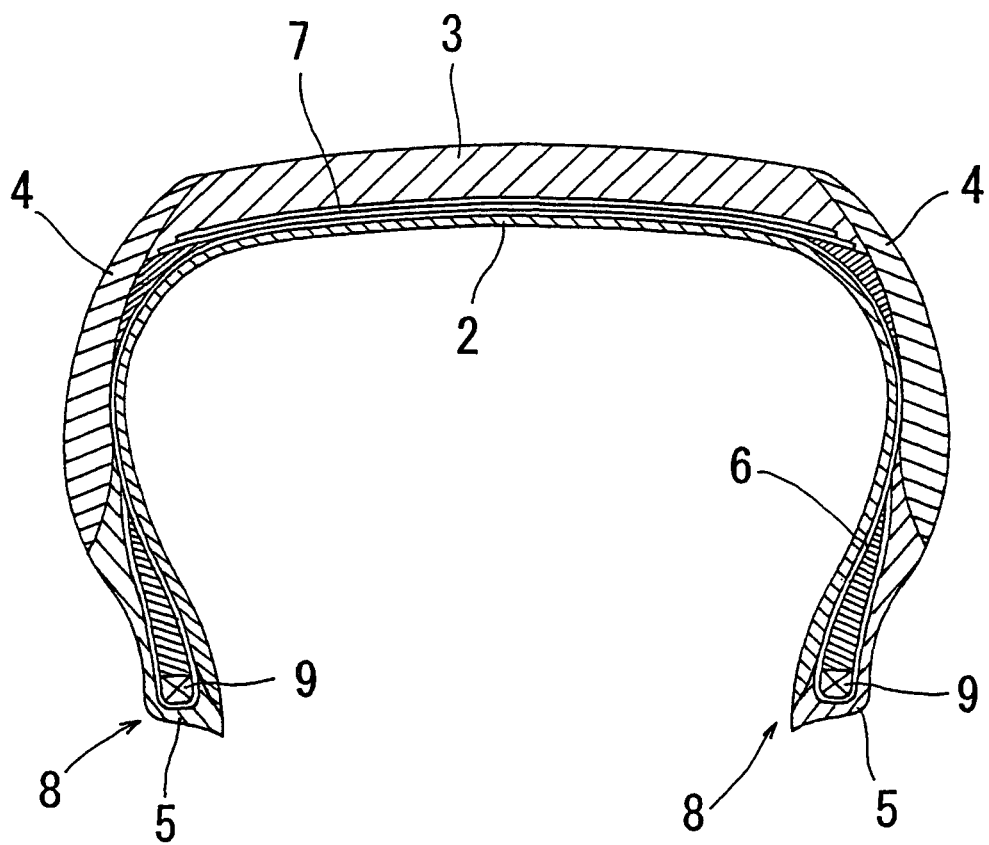
FIG. 8 is a cross sectional view illustrating a tire structure.

10: rotary support body, 11: central axis, 20: extruder, 21: head portion, 22: die, 23: support bracket, 30: holding roll, 31: roll body, 33: actuator, 35: journal member, 40a, 40b: stitching roll, 41: roll body, 43: actuator, 45: journal member, A: direction, B: advancing direction of traverse movement, C: width direction center, R: rubber strip

The invention claimed is:

1. A tire building method for spirally winding and laminating a ribbon-shaped rubber strip on an outer peripheral surface of a rotary support body, said ribbon-shaped rubber strip being supplied from a supply device being an extruder that traverses a path relative to the peripheral surface of the rotary support body, in order to form a rubber member for a tire, the method comprising:
    using a holding roll having a width to enable pressing of a total width of the ribbon-shaped rubber strip and a pair of stitching rolls disposed in parallel fore and aft in a direction of traversing movement, wherein a center line of the ribbon-shaped rubber strip is positioned between said pair of rolls in order to enable each roll of said pair to perform an independent pressing motion,
    causing the holding roll to press and bond the ribbon-shaped rubber strip in a position, in which the ribbon-shaped rubber strip is spirally wound around the peripheral surface of the rotary support body, and
    subsequent to the holding roll pressing the ribbon-shaped rubber strip, causing the stitching roll positioned in the fore position to press substantially a half part of the ribbon-shaped rubber strip in an advancing direction to bond the ribbon-shaped rubber strip.

2. The tire building method according to claim 1, further comprising the step of winding the ribbon-shaped rubber strip in plural layers.

* * * * *